Figure 1:
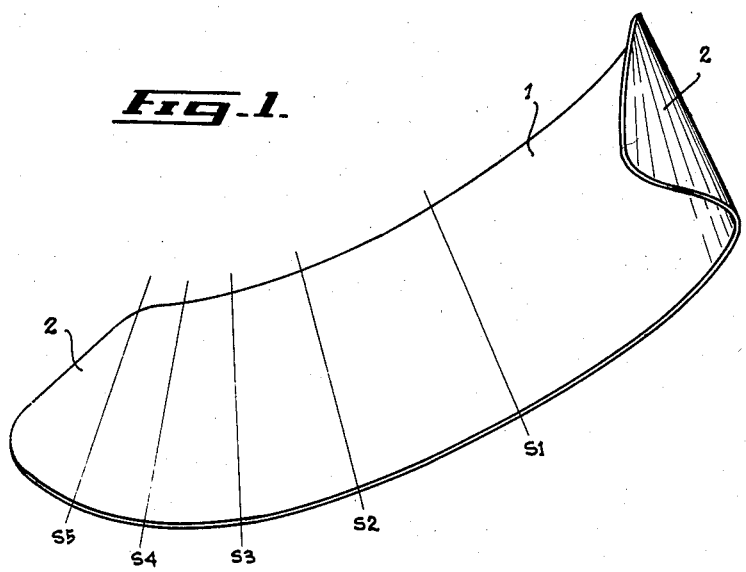

July 21, 1959     R. E. RICHARDSON     2,895,864
GLASS PRESSING NIPPER ROLLS

Filed March 23, 1956     4 Sheets-Sheet 1

Inventor
Ronald E. Richardson
By Cushman, Darby & Cushman
Attorneys

July 21, 1959   R. E. RICHARDSON   2,895,864
GLASS PRESSING NIPPER ROLLS
Filed March 23, 1956   4 Sheets-Sheet 3

Inventor
Ronald E. Richardson
By Cushman, Darby & Cushman
Attorneys

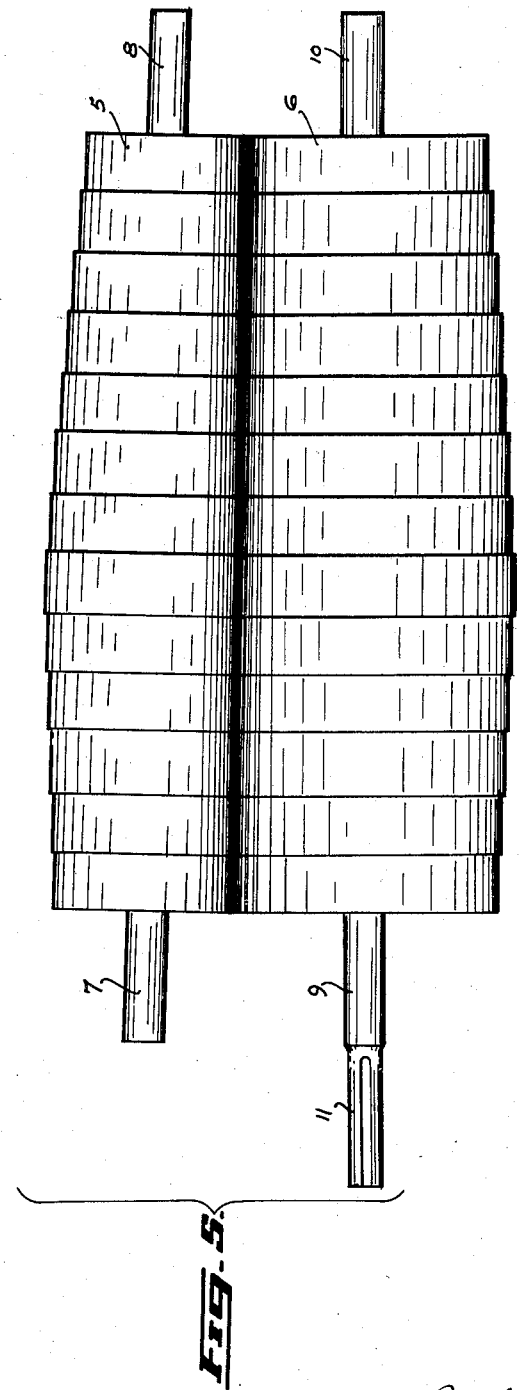

United States Patent Office 2,895,864
Patented July 21, 1959

2,895,864
GLASS PRESSING NIPPER ROLLS

Ronald E. Richardson, Oshawa, Ontario, Canada, assignor, by mesne assignments, to Pittsburgh Plate Glass Company, Pittsburgh, Pa.

Application March 23, 1956, Serial No. 573,519

Claims priority, application Canada April 12, 1955

2 Claims. (Cl. 154—2.7)

This invention relates to improvements in nipper rolls that are employed in the preliminary pressing of laminated safety glass. By far the greatest single use for this safety glass is in the manufacture of windshields and other automobile windows. The modern trend in the design of automobile rear windows and windshields is towards the so-called "wrap-around" type in which the glass is in the form of an elongated sheet, the central portion of which has a gentle curvature while the radius of curvature is sharply reduced at each end until the glass is extended almost perpendicular to the main body of the sheet.

A preliminary pressing of the laminated sheets by nipper rolls is an essential step in the manufacture of safety glass and takes place prior to the final pressing and sealing step which is effected in air or under water or oil in an autoclave. Attempts to press windshields of the "wrap-around" type in existing presses having conventional nipper rolls has led to a large instance of breakage, even up to 30% at times. Methods in which different parts of the sheet are pressed in separate individual stages by narrow rolls arranged on separate pairs of shafts, have been tried in the past, but with no great success. It is economically highly desirable to press the full width of the glass simultaneously. The object of the present invention is to provide improvements in the construction of nipper rolls that will enable the high pressures exerted by such rolls to be applied safely and simultaneously to the full width of glass sheets having small radii of curvature in some areas, such as "wrap-around" windshields and the like.

The shape of "wrap-around" windshields currently in use is such that there is at all positions along the windshield a transverse straight line which actually touches or very nearly touches the concave surface of the glass at all points across its width. (Similarly a parallel straight line would touch or essentially touch the convex surface of the glass, since the two surfaces are uniformly equi-distant from one another at all points. The concave surface will be considered merely for convenience of explaining the invention.) In other words, the windshield has no true transverse curvature. On the other hand, the radii of curvature of the two edges of the windshield are not the same, so that the various straight lines that could be drawn touching the concave surface of the glass will not be parallel with one another.

Figure 2:
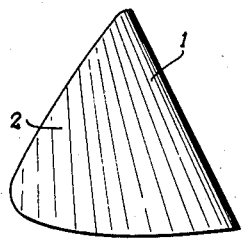

For further elucidation of the shape of "wrap-around" windshields, reference should be made to Figures 1 and 2 of the accompanying drawings, which show such a windshield in perspective and end elevation respectively.

Figure 3:
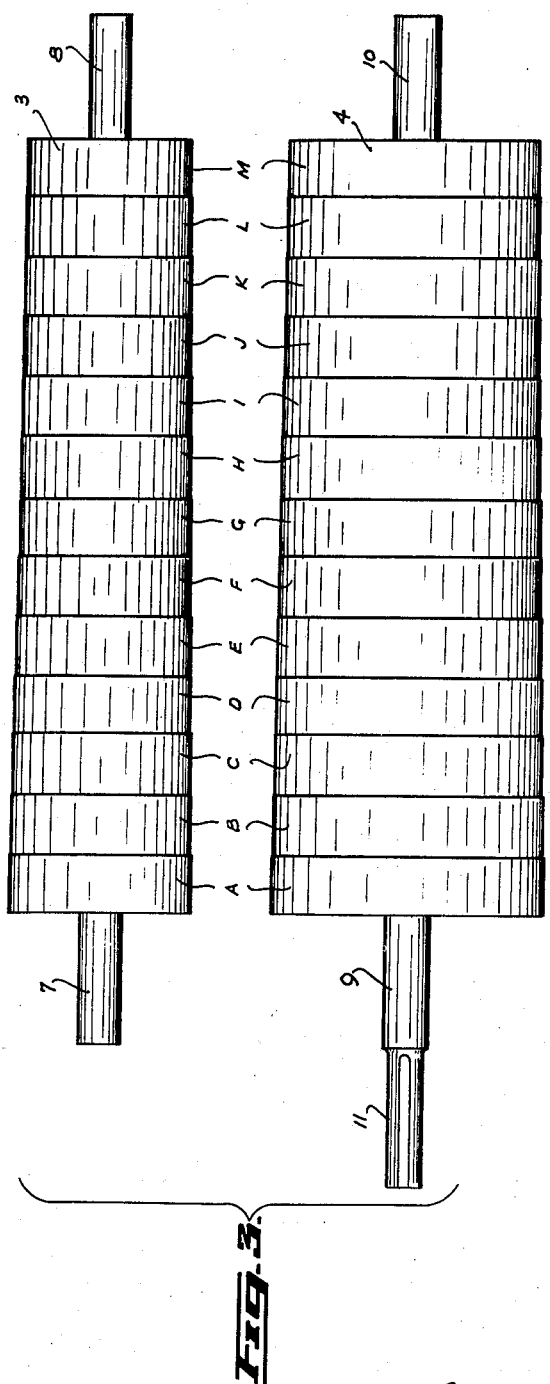
Figure 4:
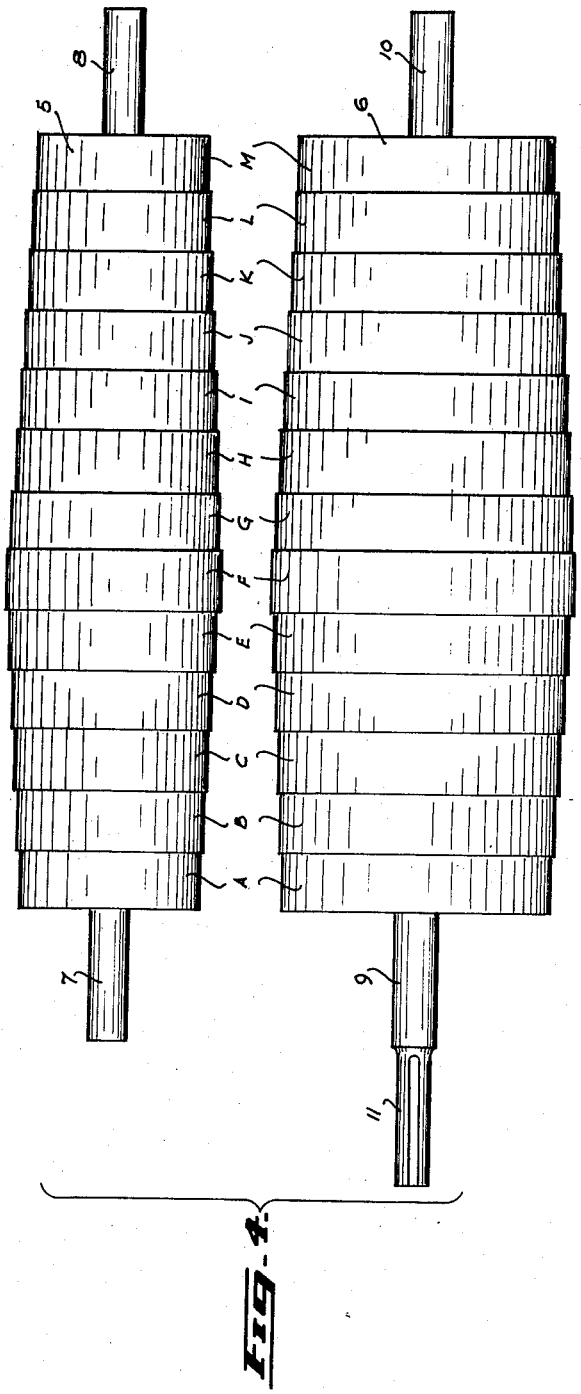

The accompanying drawings also include Figures 3, 4 and 5 which are side views of pairs of nipper rolls constructed in accordance with the present invention, Figures 3 and 4 showing such pairs of nipper rolls spaced apart from one another and Figure 5 showing the nipper rolls of Figure 4 pressed firmly together as they would be in a nipper roll press. A description of these rolls will be furnished below, following the present considerations regarding the shape of "wrap-around" windshields.

A "wrap-around" windshield 1, as shown in Figures 1 and 2, has sharply turned-back ends 2. A number of lines, S1, S2, S3, S4 and S5 drawn to touch the concave surface of the windshield at all points thereacross, in the manner referred to above, are also shown in this view. The first line S1 is located centrally of the windshield, and the other lines S2, etc. are spaced out towards one end thereof. The progressive inclination of these latter lines to the line S1 as the distance from such line increases, is evident from Figure 1.

Provided the windshield is passed between the nipper rolls so that the straight lines S1 to S5 on the glass each lie momentarily entirely in the plane defined by the axes of the rolls as the glass passes between the rolls, the high compressive force exerted by the rolls will act properly to force the laminations together in the required manner, and there will be little or no tendency for the glass to be cracked. The more the axes of the rolls fail to be aligned with a straight line that touches the surface of the glass uninterruptedly, the more there will be a twisting stress exerted on the glass tending to crack it. This has been the reason for the large number of failures experienced with conventional cylindrical nipper rolls.

The object of the present invention is to provide for feeding the glass through the rolls in such a manner as to maintain as far as possible the required alignment between the straight lines on the glass and the roll axes.

To this end, the invention consists of the provision in a nipper roll press for the preliminary pressing of curved laminated glass sheets, of a pair of resilient nipper rolls, journal means at each end of each of said rolls, and bearing means for supporting said journal means to maintain the axes of the rolls inclined to each other while lying in a common plane and with the peripheral surfaces of the rolls pressed tightly together along their lengths. In other words, the nipper rolls are in the form of truncated cones, at least in the compressed condition in which they are used in the press. Since they are of rubber or similar resilient material the compressed and relaxed conditions do not necessarily correspond exactly. Nonetheless, however, the rolls are preferably constructed so as also to be truncated cones in the relaxed condition to avoid unequal pressures between the rolls when in the compressed condition.

Unfortunately the lines S1, S2, etc. do not normally meet at a single focal point in space. The lines associated with one localized area of the glass do in general meet at one focal point except in the case of truly cylindrically bent areas, which are rare in practice. No one conical aspect, as defined by the inclination of the axes, is thus correct for the whole extent of most commercial bent glasses for automotive use, since these glasses are usually blendings of several principal cones. It is found, however, in practice, that by choosing a compromise conical aspect for the rolls, the stresses exerted on the glass can be reduced considerably below those impressed by cylindrical rolls, and that the incidence of breakage can thereby be greatly reduced.

At this point reference may be made to Figure 3 which shows diagrammatically an upper roll 3 and a lower roll 4 shown spaced apart for convenience of illustration: in use they will of course be pressed tightly together in a conventional press as later described. The rolls are preferably made of rubber, and, although the conical aspect may be provided for by forming the rolls as smooth truncated cones, it is simpler from the manufacturing point of view to form the equivalent of a truncated cone by means of a number of shallow steps in the roll. The resilience of the rubber is such that a roll stepped in this manner is functionally substantially equivalent to a smooth cone. Each of the rolls 3 and 4 will be provided with a shaft which will afford journals 7, 8, 9 and 10 by which such rolls may be mounted in suitable bearings (not shown) in a conventional nipper roll press. The shaft of the lower roll 4 is extended beyond the journal 9 and is provided with a splined portion 11 by which such lower roll 4 may be rotated in the press. Although each roll is preferably constructed in one piece, each stepped portion has been designated by a separate letter in order to facilitate consideration of the various diameters. The roll 3 is considered as being made up of portions extending from 3A down to 3M. Similarly the roll 4 may be considered as composed of sections 4A down to 4M. The upper roll 3 is somewhat smaller in diameter than the lower roll 4 in accordance with the usual practice, since the glass will be passed through between the rolls with its concave surface upwardly, and the larger lower roll 4, which is the driven roll, will provide the necessary additional support beneath the convex surface of the glass.

In addition to the conical aspect given to the rolls, a hump aspect is also preferably, although not necessarily, provided, as shown by rolls 5 and 6 of Figure 4, the letters A to M being employed to designate the stepped portions of these rolls as in the case of the rolls 3 and 4. A numerical example will serve best to illustrate how the conical aspect may be taken alone to provide the rolls 3 and 4 seen in Figure 3 or may be added to the hump aspect to form the rolls 5 and 6 seen in Figure 4.

| Portion of Roll | Basic Conical Aspect in inches | Portion of Roll | Hump Aspect in Inches | Total Diameter of Combined Aspects |
|---|---|---|---|---|
| 3A | 6.165 | 5A | --------- | 6.165 |
| 3B | 6.135 | 5B | .080 | 6.215 |
| 3C | 6.110 | 5C | .180 | 6.290 |
| 3D | 6.080 | 5D | .280 | 6.360 |
| 3E | 6.055 | 5E | .380 | 6.435 |
| 3F | 6.025 | 5F | .480 | 6.505 |
| 3G | 6.000 | 5G | .500 | 6.500 |
| 3H | 5.970 | 5H | .480 | 6.450 |
| 3I | 5.945 | 5I | .380 | 6.325 |
| 3J | 5.915 | 5J | .280 | 6.195 |
| 3K | 5.890 | 5K | .180 | 6.070 |
| 3L | 5.860 | 5L | .080 | 5.940 |
| 3M | 5.835 | 5M | --------- | 5.835 |
| 4A | 10.270 | 6A | --------- | 10.270 |
| 4B | 10.225 | 6B | .080 | 10.305 |
| 4C | 10.180 | 6C | .160 | 10.340 |
| 4D | 10.135 | 6D | .240 | 10.375 |
| 4E | 10.090 | 6E | .320 | 10.410 |
| 4F | 10.045 | 6F | .400 | 10.445 |
| 4G | 10.000 | 6G | .400 | 10.400 |
| 4H | 9.955 | 6H | .400 | 10.355 |
| 4I | 9.910 | 6I | .320 | 10.230 |
| 4J | 9.865 | 6J | .240 | 10.105 |
| 4K | 9.820 | 6K | .160 | 9.980 |
| 4L | 9.775 | 6L | .080 | 9.855 |
| 4M | 9.730 | 6M | --------- | 9.730 |

The hump aspect added to the upper roll 5 is numerically somewhat greater than that added to the lower roll 6. This is to allow for wear. Thus the hump aspect of the upper roll 5 may be considered as a combination hump aspect and wear aspect, but as these aspects are symmetrical with respect to each other and approximately proportional to one another, they have been lumped together in the above table under the heading of "hump aspect."

The purpose of the hump aspect which is applied to both rolls is to provide a slight excess pressure centrally of the transverse direction of the glass, which aids in squeezing out any air that may have been trapped between the laminations of the sheets. This excess pressure is possible because the glass is stronger in the centre, not being weakened by the proximity of the cut edges.

The effect of the hump aspect would at first sight appear to be contrary to that of the conical aspect, in that the largest diameters occur not at the sections A but at the sections F. This effect is only apparent, however, when the rolls are in the relaxed condition seen in Figures 3 and 4. Figure 5 has been provided to demonstrate why, when the rolls are pressed tightly together in a nipper roll press, the hump aspect becomes in effect a pressure aspect, and does not interfere with the effect of the conical aspect on the movement of the glass between the rolls.

As has been indicated above, it is a feature of the present invention that the rolls be formed with a conical aspect. It is even more essential that the rolls be mounted in the press with their axes inclined to one another, although such axes will always lie in a common plane which passes through the line along which the peripheral surfaces of the rolls meet. In view of the high pressure between the rolls and the resiliency of the rubber of which they are formed, it would be more true to say that such plane passes through the centre line of a narrow elongated area over which the peripheral surfaces of the rolls are in contact. It is basically the inclination of the roll axes which ensures that the rolls are conical when under pressure. If they were not formed similarly conical when relaxed, the pressure between the rolls would be uneven, and for this reason it is strongly preferred that the rolls be formed with peripheral surfaces substantially in the form of cones. The only irregularity of pressure between the roll surfaces will then be that specifically provided for by the hump aspects of the two rolls.

As explained, the angle of cone which is required (being determined by the shape of the glass) is set by the angle of inclination of the axes of the two rolls. The conical aspects imposed upon the two rolls will then preferably be such that the sum of their inclinations is equal to the angle between the axes. In this case it is essential that the total inclination be distributed proportionately between the two rolls, i.e. in proportion to their diameters. This has been done in the example given above, the reduction in diameter in the lower roll 4 (or that part of the reduction in diameter due to the conical aspect in the lower roll 6) from one end to the other, i.e. 0.540", bearing substantially the same ratio to the corresponding reductions in diameter of the upper rolls 3 and 5, i.e. 0.330", that the mean basic diameter of the lower rolls (10") bears to the mean basic diameter of the upper rolls (6"). This could be stated in another way by saying that the ratio of the maximum diameter of one cone to its minimum diameter is substantially the same as the ratio of the maximum and minimum diameters of the other cone. It is desired to stress once more that the invention resides basically in the inclination of the axes of the rolls so that they are in the form of truncated cones when stressed in a nipper roll press. The formation of the conical aspects on the cones in their relaxed condition is undertaken to ensure uniformity of pressure between the rolls, except as provided for by the hump aspects. When conical aspects are provided, however, they must be substantially proportional to one another to ensure correspondence between the peripheral speeds of the rolls at all points therealong. Failure to provide reasonably close correspondence would involve undue slippage between the rolls at some point and would soon result in damage to the rolls.

I claim:

1. In a nipper roll press for the preliminary pressing of curved laminated glass sheets, a first resilient nipper roll of varying diameter longitudinally, said variation being compounded of a progressive increase of diameter in one longitudinal direction to provide said roll with a conical aspect and a symmetrical increase of diameter from each end longitudinally towards the centre of the roll to provide said roll with a hump aspect, a second resilient nipper roll of varying diameter longitudinally, said variation being compounded of a progressive increase of diameter in one longitudinal direction to provide said roll with a conical aspect and a symmetrical increase of diameter from each end longitudinally towards the centre of the roll to provide said roll with a hump aspect, the mean diameter of said second cone being greater than the mean diameter of the first cone and the ratio of the diameter of one end of the first cone to the diameter of the other end of the first cone being substantially equal to the corresponding ratio of the second cone, journal means at each end of each of said rolls, and bearing means rotatably mounting said journal means, said bearing means being structurally positioned to maintain the axes of said rolls inclined to each other while lying in a common plane with both rolls tapering in the same direction and to maintain the opposing surfaces of the rolls pressed tightly together along their entire lengths, the angle of mutual inclination of said axes being generally equal to the sum of the conical aspects of the two rolls.

2. In a nipper roll press for the preliminary pressing of curved laminated glass sheets, a pair of resilient nipper rolls, journal means at each end of each of said rolls, and bearing means for supporting said journal means, said bearing means being structurally positioned to maintain the axes of the rolls inclined to each other while lying in a common plane and with the peripheral surfaces of the rolls pressed tightly together along their entire lengths, each of said rolls being of varying diameter longitudinally, said variation being compounded of a progressive increase of diameter in one longitudinal direction to provide said roll with a conical aspect and a symmetrical increase of diameter from each end longitudinally towards the centre of the roll to provide said roll with a hump aspect.

References Cited in the file of this patent

UNITED STATES PATENTS

| | | |
|---|---|---|
| 1,960,580 | Fraser | May 29, 1934 |
| 2,191,144 | Hornbostel | Feb. 20, 1940 |
| 2,729,581 | Pascoe et al. | Jan. 3, 1956 |
| 2,784,585 | Kauffman | Mar. 12, 1957 |